United States Patent [19]
Maruyama et al.

[11] Patent Number: 5,912,092
[45] Date of Patent: Jun. 15, 1999

[54] BATTERY PACKAGE

[75] Inventors: Hiroshi Maruyama, Ibaraki-ken; Eiji Matsumasa, Kyoto; Hideaki Ebihara, Otokuni-gun, all of Japan

[73] Assignee: Hitachi Maxell, Ltd., Osaka-fu, Japan

[21] Appl. No.: 08/966,030

[22] Filed: Nov. 7, 1997

[30] Foreign Application Priority Data

Nov. 7, 1996 [JP] Japan ..................................... 8-312690

[51] Int. Cl.⁶ .................................................. H01M 2/10
[52] U.S. Cl. ................. 429/96; 429/93; 429/121
[58] Field of Search ................. 429/96, 97, 100, 429/123, 121, 122, 93

[56] References Cited

U.S. PATENT DOCUMENTS 5,607,791   3/1997   Garcia et al. ............................ 429/96
5,693,431   12/1997  Nierescher et al. ...................... 429/97
5,726,859   3/1998   Khadem et al. ........................ 429/96 X Primary Examiner—Anthony Skapars

[57] ABSTRACT

A battery package including a battery having at least one flat mount face defined therein, an electric circuit device for controlling discharging and charging of the battery, and a generally plate-like protective member mounted on the battery so as to cover the electric circuit device. The electric circuit device is made up of a plurality of circuit component parts and is mounted on the flat mount face with the circuit component parts held in tight contact with the flat mount face. The protective member includes an oblong plate member and side flanges protruding transversely from opposite side edges of the plate member to define a cavity. In an assembled condition with the protective member fitted to the battery, the electric component parts are accommodated within the cavity.

5 Claims, 5 Drawing Sheets

BATTERY PACKAGE

BACKGROUND OF THE INVENTION 1. (Field of the Invention)

The present invention generally relates to a secondary battery such as, for example, a lithium ion secondary battery and, more particularly, to a battery package housing the secondary battery together with a circuit means for controlling selective charging and discharging of the battery.

2. (Description of the Prior Art)

It is well known the secondary battery, for example, the lithium ion battery, of a kind involving a relatively large energy during charging or discharging tends to be deteriorated when the secondary battery is over-charged or over-discharges. Accordingly, some of the commercially available secondary batteries are marketed in the form as equipped with a protective circuit necessitated to secure a safety factor and to increase the reliability.

While the secondary battery is often handled by children and aged persons, in order to protect the protective circuit not only electrically, but also physically, it has long been considered necessary to design a special housing effective to accommodate both of the battery and the protective circuit together with all necessary elements.

With the advent of the age of electronic appliances being downsized, demand for downscaling of the secondary battery for use in such electronic appliances has arisen. However, the presence of the housing has limited the extent to which the secondary battery can be downscaled.

SUMMARY OF THE INVENTION

The inventors have conducted researches extensively in an attempt to downscale the secondary battery and have found that the safety factor and the durability of the secondary battery could be secured sufficiently when electronic circuit component parts were disposed in tight contact with one surface of the body of a secondary battery and were then enclosed for protection. The present invention is based on this finding and is intended to provide an improved battery package effective to contribute to downscaling and down-weighing of the secondary battery without both of the safety factor and the durability being sacrificed.

Accordingly, the present invention provides a battery package including a battery having at least one flat mount face defined therein, an electric circuit device for controlling discharging and charging of the battery, and a generally plate-like protective member mounted on the battery so as to cover the electric circuit device. The electric circuit device is made up of a plurality of circuit component parts and is mounted on the flat mount face with the circuit component parts held in tight contact with the flat mount face. The protective member includes an oblong plate member and side flanges protruding transversely from opposite side edges of the plate member to define a cavity. In an assembled condition with the protective member fitted to the battery, the electric component parts are accommodated within the cavity.

Preferably, the battery is of a generally rectangular configuration having four side surfaces and top and bottom surfaces. In this case, one of the side surfaces defines the mount face. The protective member may further include upper and lower end plates formed unitarily with the oblong plate member so as to extend transversely from respective opposite ends of the oblong plate member, so that the top and bottom surfaces of the battery can be covered by the upper and lower end plates.

The electric component parts may be classified into a first group of the electric component parts of a relatively small size and a second group of the electric component parts of a relatively large size, so that the electric component parts of the first group and the electric component parts of the second group can be covered by respective halves of the oblong plate member. The oblong plate member is preferably spaced from the mount face a distance determined in consideration of the respective sizes of the first and second groups of the electric component parts.

If desired, the protective member may be utilized as a circuit board on which the electric component parts are mounted.

Although the electric circuit device may be of any known circuit design, the electric circuit device used in the present invention include a first control means for disabling a charging of the battery when a voltage across the battery during the charging exceeds a first upper limit voltage and for enabling the charging of the battery when the voltage across the battery lowers below a first lower limit voltage, a second control means for forcibly halting the charging of the battery when the voltage across the battery during the charging exceeds a second upper limit voltage which is higher than the first upper limit voltage, a third control means for interrupting a supply of an electric power to the first and second control means when a voltage supplied from an external source exceeds a third upper limit value which is higher than the second upper limit voltage, and a fourth control means for forcibly halting a supply of an electric power to the battery when a surface temperature of the battery exceeds a predetermined value.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 3 includes FIGS. 3A to 3C, wherein FIG. 3A is a schematic cross-sectional view of the battery package taken along the line A—A in FIG. 2, FIG. 3B is a fragmentary enlarged view of an upper portion of the battery package that is encompassed by the circle in FIG. 3A, and FIG. 3C is a fragmentary enlarged view of a lower potion of the battery package that is encompassed by the circle in FIG. 3A;

DETAILED DESCRIPTION OF THE EMBODIMENT

In the following description of a preferred embodiment of the present invention, the present invention will be described as applied to a lithium ion secondary battery of a generally rectangular configuration. However, it should be understood that the present invention is not limited to the lithium ion secondary battery and is equally applicable to any secondary battery of any suitable configuration so long as the battery requires a package.

Figure 1:
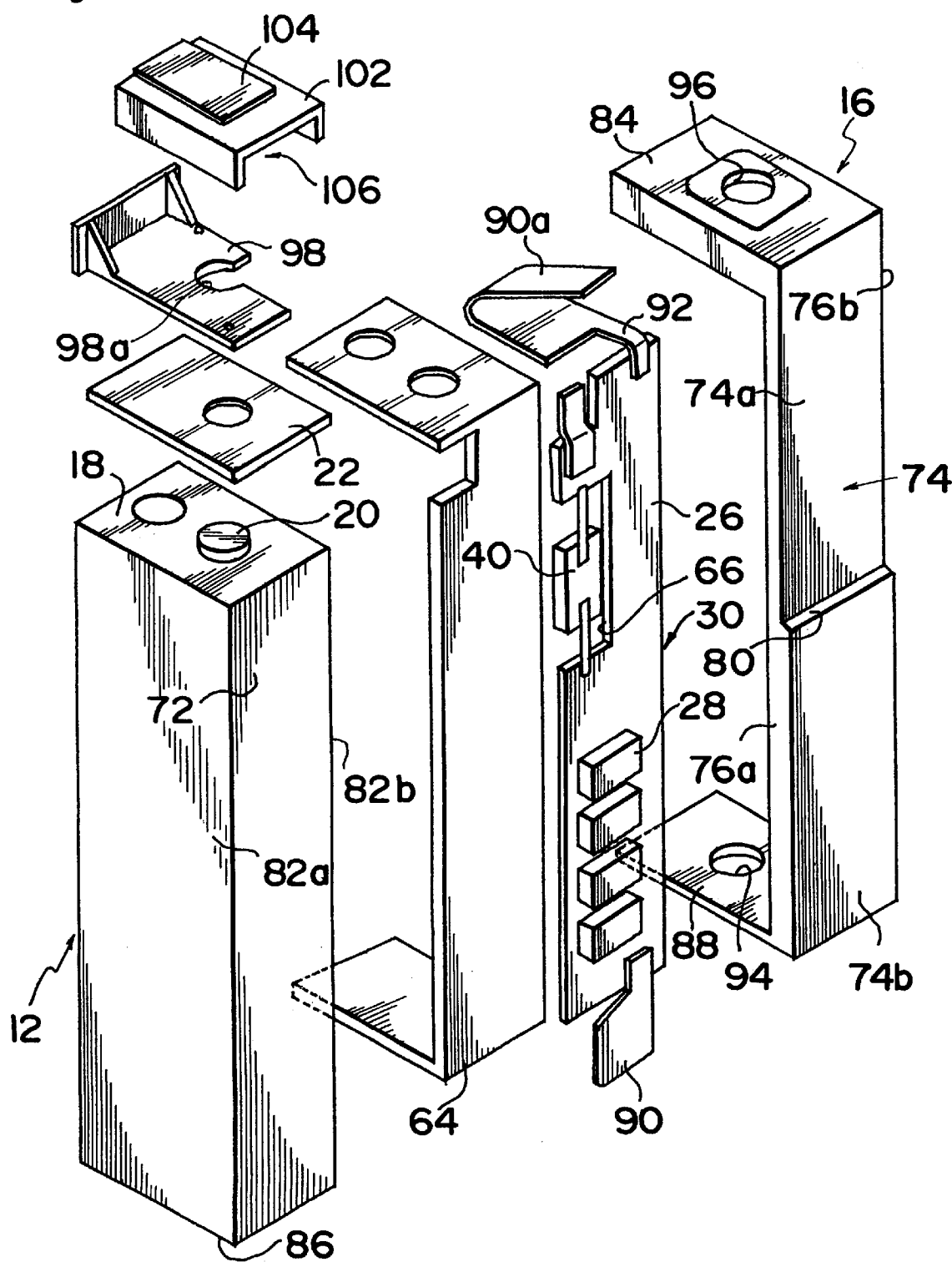
FIG. 1 is an exploded view of a battery package according to the present invention.
Figure 2:
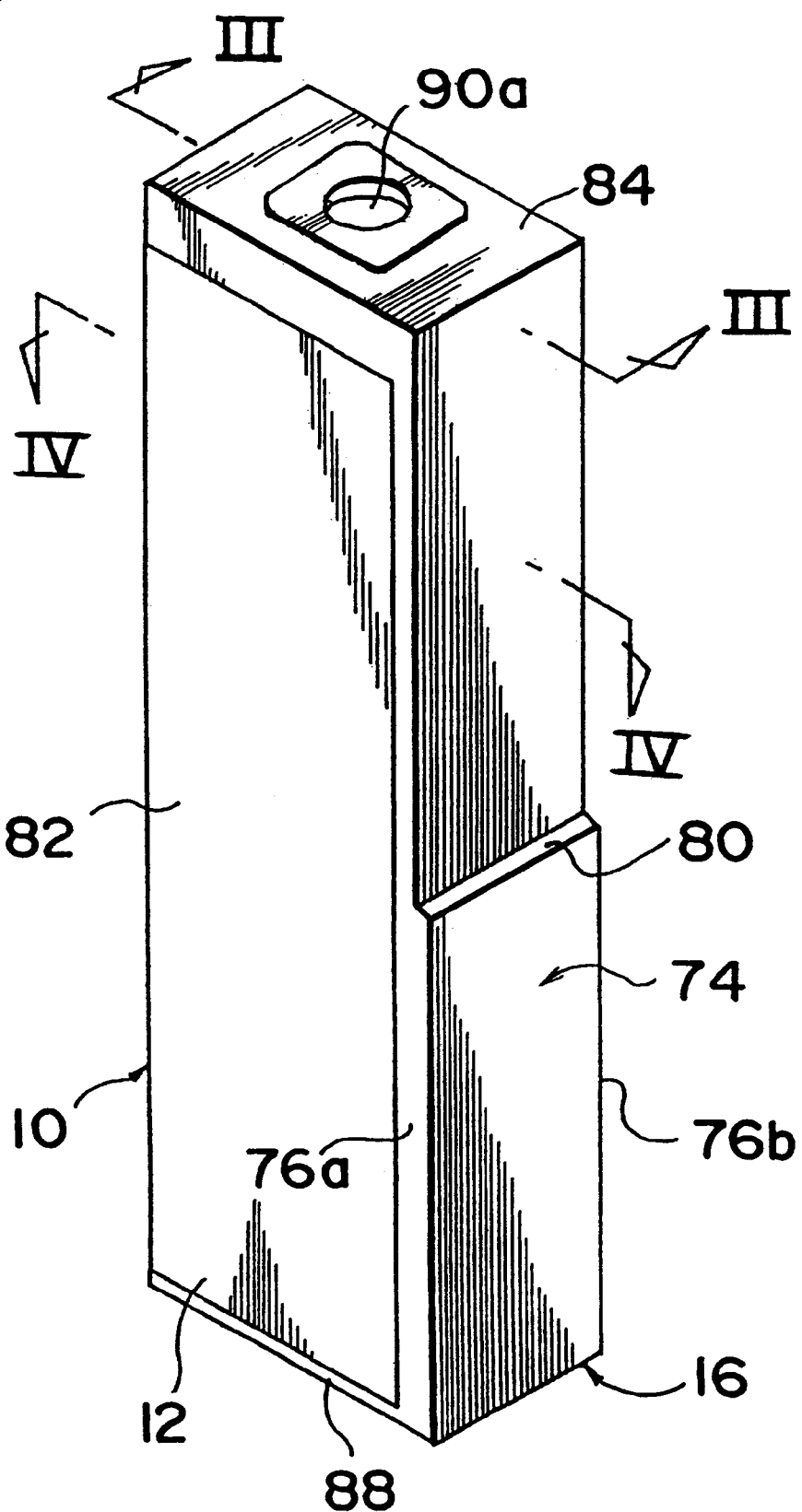
FIG. 2 is a perspective view of the battery package of FIG. 1 in an assembled condition.

Referring to the accompanying drawings, and particularly to FIGS. 1 and 2, a battery package is generally identified by 10. The battery package 10 includes a generally rectangular block-like battery 12, an electronic circuit device 30 for executing a control to regulate selective charging and discharge of the battery 12, and a protective member 16 for enclosing the electronic circuit device 30.

The battery 12 shown therein is a lithium ion secondary battery and has an internal plus terminal 20 disposed on one of opposite ends thereof, for example, an upper end face 18 thereof, at a location slightly laterally offset from the longitudinal axis of the battery 12. An electrically insulating member 22, in the form of either an oblong sheet or an oblong plate, having a perforation defined therein is mounted on the upper end 18 of the battery with the internal plus terminal 20 protruding outwardly through the aperture in the insulating member 22. In addition to the upper end face 18, the battery 12 has a lower end face 86 opposite to the upper end face 18, major side faces 82a and 82b opposite to each other and minor side faces opposite to each other.

It is to be noted that one of said minor side faces is identified by 72 and serves as a mount face as will be described later. It is also to be noted that the entire exterior surface of the battery 12, including the various faces 18, 72, 82a, 82b and 86, other than an surface area where the internal plus terminal 20 is situated serves as an internal minus terminal 24 shown in FIG. 5. As will become clear from the subsequent description, the internal plus and minus terminals 20 and 24 are electrically connected with external plus and minus terminal members 90a and 90b, shown in FIG. 5, of the battery package, respectively.

Figure 5:
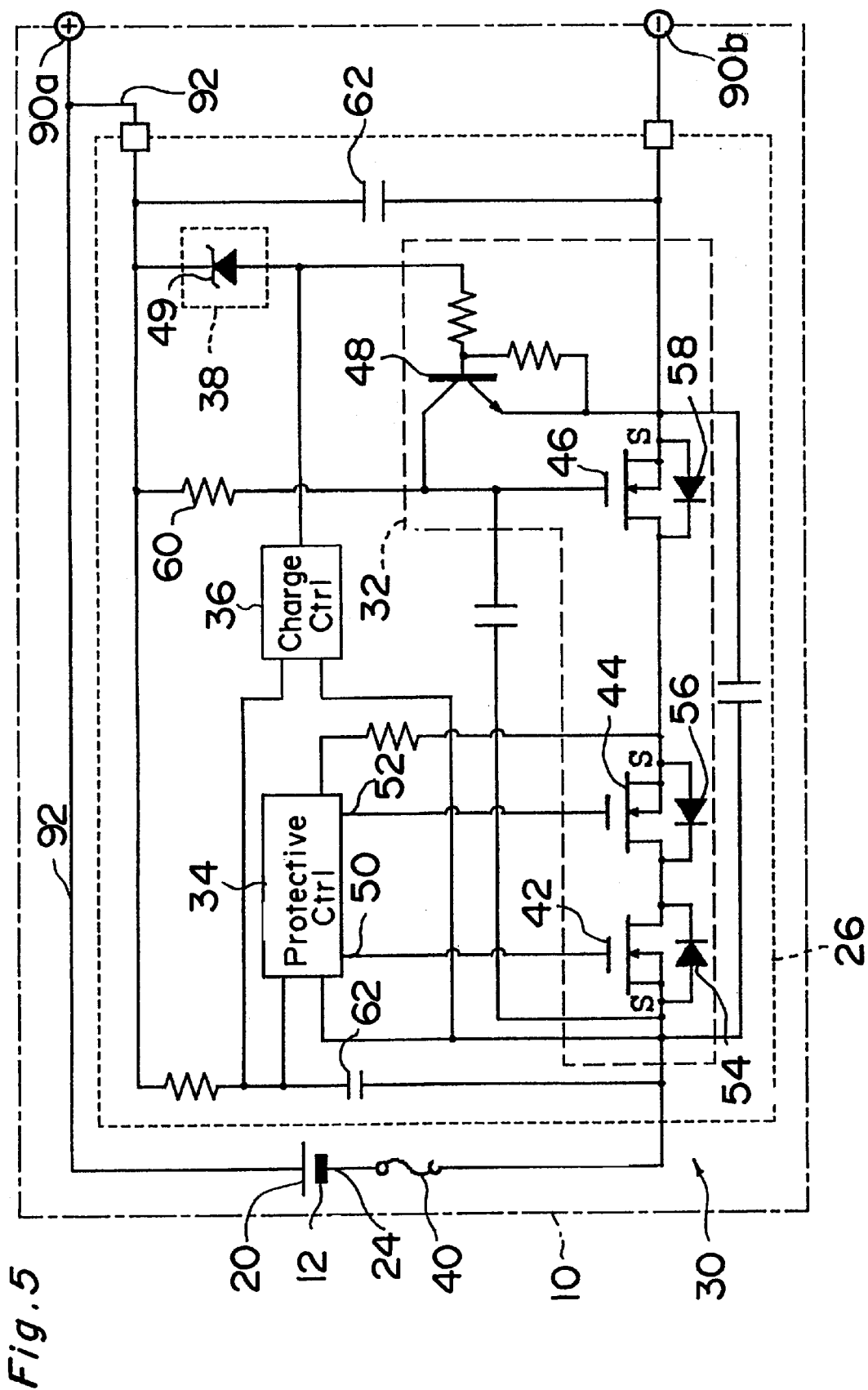
FIG. 5 is a block circuit diagram of an electronic circuit used in the battery package.

The electronic circuit device 30 comprises a plurality of electronic circuit component parts 28 mounted on a generally elongated printed circuit board 26, the circuit details of which are shown in FIG. 5. Referring now to FIG. 5, the electronic circuit device 30 includes a switching circuit 32 connected between the internal minus terminal 24 and the external minus terminal member 90b for controlling the flow of an electric power therethrough; a protective control circuit 34 for detecting an overcharging or overdischarging during charging or discharging of the battery 12 or an overcurrent condition to protect the battery 12; a charge control circuit 36 for performing a control to keep a voltage across the battery 12 at a predetermined value during charging; a power supply control circuit 38 for interrupting an input, in the event that the voltage charged is abnormally high, to thereby protect the protective control circuit 34 and the charge control circuit 36; and a temperature responsive fuse 40 which fuses to open a circuit in the event of an overheated condition occurring in the battery 12.

The switching circuit 32 includes first and second switching elements 42 and 44 each being controlled by the protective control circuit 34 and third and fourth switching elements 46 and 48 each controlled by the charge control circuit 36 and the power supply control circuit 38. Each of the first to third switching elements 42, 44 and 46 is employed in the form of a field effect transistor and is disposed on a line between the internal minus terminal 24 and the external minus terminal member 90b for selectively opening and establishing the line with their source and drain terminals connected in series with each other.

More specifically, the first switching element 42 is used to control the timing of discharge taking place in the battery 12 and has a gate connected with a discharge control terminal 50 of the protective control circuit 34. A first diode 54 is connected parallel to a source-drain path of the first switching element 42 and is oriented in such a direction that although charging of the battery 12 is possible regardless of the ON or OFF state of the first switching element 42, discharge of the battery 12 can take place only when the first switching element 42 is switched on in response to a discharge ON signal from the protective control circuit 34.

The second switching element 44 has a gate connected with a charge control terminal 52 of the protective control circuit 34. A second diode 56 is connected parallel to a source-drain path of the second switching element 44 and is oriented in such a charging direction that although discharge of the battery 12 is possible regardless of the ON or OFF state of the second switching element 44, charging of the battery 12 can take place only when the second switching element 44 is switched on in response to a charge ON signal from the protective control circuit 34.

The manner of control implemented by the protective control circuit 34 is similar to that employed in the prior art. Specifically, the protective control circuit 34 operates to switch off the first switching element 42 to forcibly halt discharging when during discharge an overdischarge condition in which the voltage across the battery 12 is lowered to a value lower than a predetermined value is detected or when an overcurrent condition in which the electric current being discharged exceeds a predetermined value is detected. Conversely, when an overcharged condition in which the voltage charged on the battery increased to a value higher than a predetermined value, or when an overcurrent condition in which the charged current exceeds a predetermined value, the protective control circuit 34 causes the second switching element 44 to be switched off to forcibly halt charging of the battery 12. While the battery 12 is electrically protected in the manner discussed above, the specific manner of control may not be always limited to that described above.

A third diode 58 is connected parallel to a source-drain path of the third switching element 46 in a discharging direction. The third switching element 46 has a gate connected through a resistor 60 with a plus line (represented by an electroconductive lead plate 92 as shown in FIG. 1 and as will be described later) between the internal plus terminal 20 and the external plus terminal member 90a. This third switching element 46 has a gate-source path connected parallel to the fourth switching element 48 which may be an NPN-type transistor and which has a base adapted to receive a charge control signal outputted from the charge control circuit 36. In this circuit arrangement, although the third switching element 46 can be switched on by the application of an ON signal supplied through the resistor 60 upon application of a charge voltage from the outside of the circuit, the fourth switching element 48 is switched on when the charge control circuit 36 outputs an OFF signal, accompanied by shortcircuiting between the gate and source of the third switching element 46 to switch it off. In this way, the third switching element 46 can be controlled indirectly through the fourth switching element 48.

The charge control circuit 36 is so designed and so configured as to perform a cyclic ON and Off control operation, as shown by a solid-line curve in FIG. 6, in such a way that the charge control circuit 36 outputs an OFF signal to interrupt charging when a voltage exceeds a first upper limit voltage VU1, but ceases generation of the OFF signal when the voltage lowers below a first lower limit voltage VL1, thereby causing the battery to be pulsatedly charged while the voltage across the battery 12 is kept at approximately 4.09 volts. It is to be noted that the first upper limit voltage VU1 and the first lower limit voltage VL1 may be chosen, for example, 4.10 volts and 4.08 volts, respectively.

Figure 6:
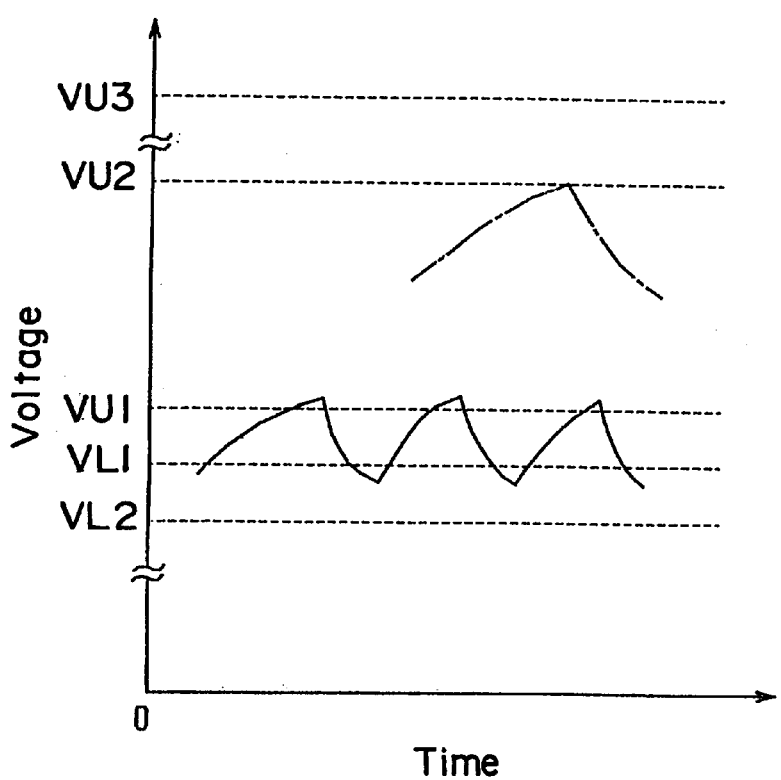
FIG. 6 is a graph showing waveforms appearing in the electronic circuit during charging of the battery package.

On the other hand, even in the protective control circuit 34, by setting a second upper limit voltage VU2 sufficiently higher than the first upper limit voltage VU1, for example, 4.25 volts, and a second lower limit voltage VL2 slightly lower then the first lower limit voltage VL1, for example, 4.05 volts, the charge control operation can be performed by the protective control circuit 34 as shown by a single-dotted curve in FIG. 6 even though the charge control circuit 36 fails to perform the control operation properly.

A Zener diode 49 having a threshold voltage or third upper limit for voltage VU3, for example, 6.8 volts, which is sufficiently higher than the voltage to which the battery 12 can be charged is connected as the power supply control circuit 38 between the base of the fourth switching element 48 and the plus line or lead plate 92. The use of the Zener diode 49 is effective in that even when an extremely high voltage is applied from the outside to the battery package 10 by reason of, for example, choice of a wrong charging device, the Zener diode 49 can be immediately brought in a conducting state to switch the fourth switching element 48 on and hence to switch the third switching element 46 off so that the power supply can be halted at an entrance to the battery package 10. In this way, the protective control circuit 34 and the charge control circuit 36 thus serve to protect against a possible damage resulting from application of an overvoltage.

The temperature responsive fuse 40 is connected in series with the battery 12 so that in the event that all of the control circuits 34, 36 and 38 fail to operate properly and the battery 12 is overcharged or loaded with an overcurrent, and when the temperature of the battery 12 consequently increases to a value higher than a predetermined value, the fuse 40 can fuse to thereby protect the battery 12 as the last resort.

Various capacitors 62 employed in the electronic circuit device 30 may have a relatively high capacitance, for example, 0.1 $\mu$F and operable to bypass noises to avoid the possibility of the electronic circuit device 30 functioning erroneously.

Although the protective control circuit 34 and the charge control circuit 36 are integrated together in an IC chip, the possibility of both control circuits 34 and 36 being damaged simultaneously under the influence of static electricity and/or physical shocks can be eliminated if circuit elements such as, for example, CMOS, N-channel MOS or TTL, having different physical or electrical characteristics are employed.

The electronic circuit device 30 of the above described circuit design including the various electronic circuit component parts 28 are formed on the printed circuit board 26 with the component parts 28 soldered thereto. This printed circuit board 26 is of a size similar to, but slightly undersized relative to one of the minor side faces, that is, the mount face 72, of the battery 12 and is fixedly bonded to the mount face 72 by the use of a double-sided adhesive strip 64.

Figure 3:
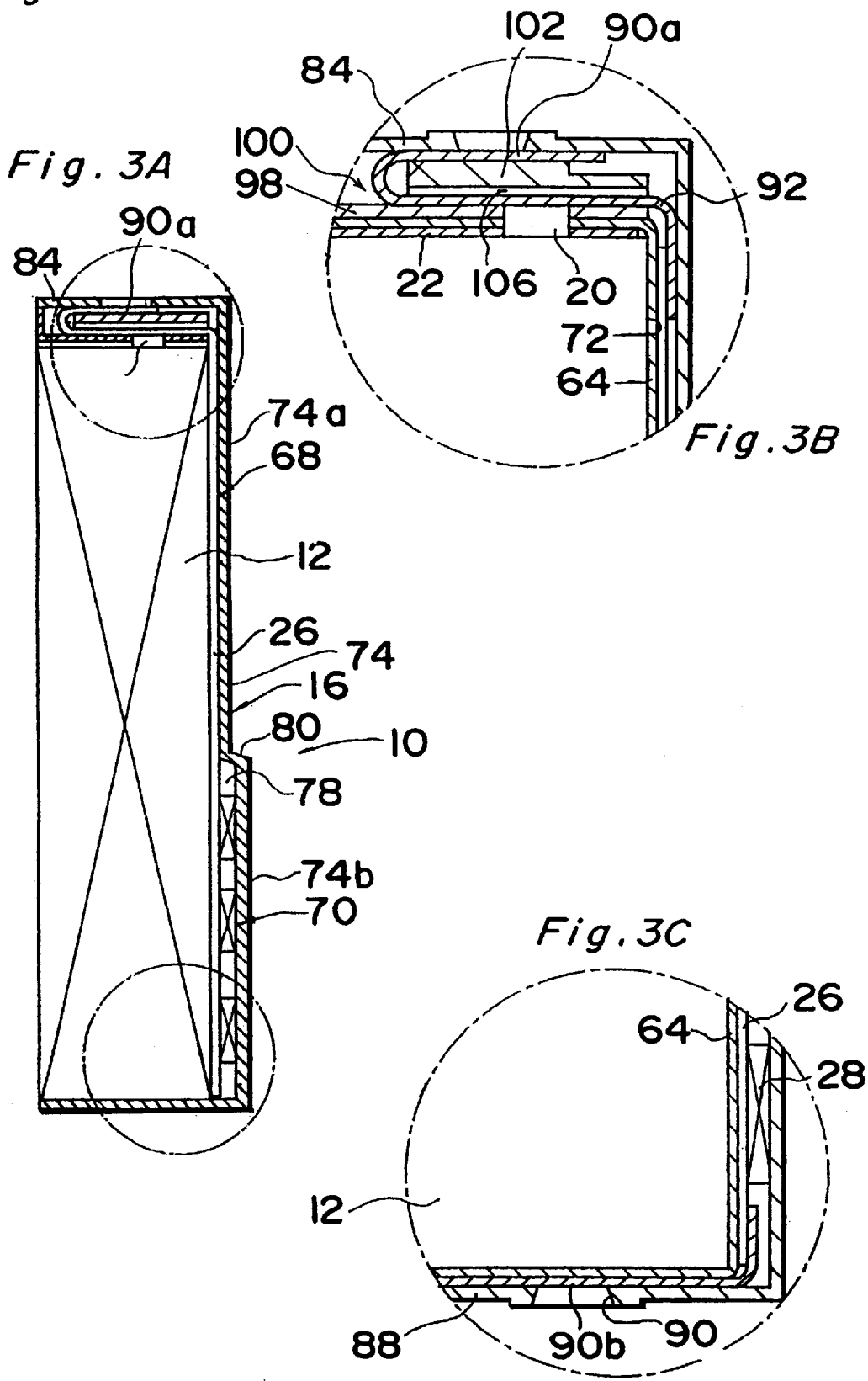

It is, however, to be noted that of the various electronic circuit component parts 28 the temperature responsive fuse 40 must be held in position to detect directly the surface temperature of the battery 12. For this reason, the printed circuit board 26 has a cutout defined at 66 in an upper half of the printed circuit board 26 and the temperature responsive fuse 40 is situated within this cutout 66. The various electronic circuit component parts 28 are classified into two groups: The first group is identified by 68 and includes some of the electronic circuit component parts 28 which are of a relatively small size and/or thickness such as the temperature responsive fuse 40, and the second group is identified by 70 and includes the rest of the electronic circuit component parts 28 which are of a relatively large size and/or thickness such as IC chips. As shown in FIG. 3, the electronic circuit component parts 26 of the first group 68 and the electronic circuit component parts 28 of the second group 70 are mounted on the upper and lower halves of the printed circuit board 26, respectively.

Figure 4:
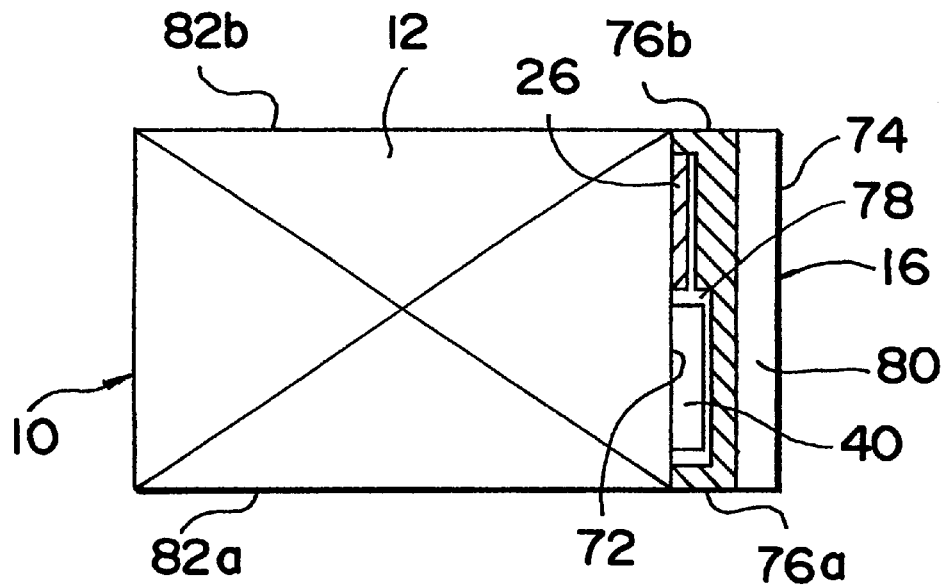
FIG. 4 is a cross-sectional view of the battery package taken along the line B—B in FIG. 2.

As shown in FIGS. 3 and 4, the protective member 16 for protective the electronic circuit device 30 described above includes a generally rectangular solid plate member 74 having side flanges 76a and 76b protruding transversely from opposite side edges of the solid plate member 74 and extending over the generally entire length thereof. The plate member 74 is of a size generally sufficient to be encompassed within the geometric envelope of the mount face 72 of the battery 12. Thus, the protective member 16 has a cavity 78 delimited by the plate member 74 and the side flanges 76a and 76b for accommodating therein the electronic circuit device 30 when the protective member 16 is fitted to the mount face 72.

The plate member 74 has upper and lower halves 74a and 74b separated by a shoulder 80 and, therefore, the upper half 74a has a thickness smaller than that of the lower half 74b. The presence of the shoulder 80 is effective to provide a cue by which the battery package 10 can be correctly mounted in an electric appliance, that is, to avoid the possibility that the user trying to load the battery package carelessly may mount the battery package 10 in the wrong way.

Preferably, the protective member 16 has a width, as measured between respective outer surfaces of the side flanges 76a and 76b, which is equal to or substantially equal to the width of the mount face 72 as clearly shown in FIG. 4 so that, when the protective member 16 is fitted to the mount face 72, opposite side faces of the protective member 16 can be held in flush with the major side faces 82a and 82b of the battery 12, respectively, so that the battery package 10 can have an appealing appearance.

The protective member 16 of the structure so far described is sufficient for the purpose of the present invention, i.e., to protect the electronic circuit device 30. However, in the illustrated embodiment, the protective member 16 is of a generally U-shaped one-piece construction including, in addition to the plate member 74 with the side flanges 76a and 76b, top and bottom plates 84 and 88 unitarily extending in the same direction transversely from opposite ends of the plate member 16 so as to cover the upper and lower end faces 18 and 86 of the battery 12. The use of the generally U-shaped protective member 16 including the top and bottom plates 84 and 88 in addition to the plate member 74, such as used in the illustrated embodiment, is not only effective to accomplish a firm fitting of the protective member 16 to the battery 12, but also effective to allow the top plate 84 to protect the lead plate 92 that defines the external plus terminal member 90a.

The bottom plate 88 integral with the plate member 74 has a perforation 94 defined therein and is adapted to cover the lower end face 86 of the battery 12. This bottom plate 88, when the protective member 16 is fitted to the battery 12 in the manner described hereinbefore, cooperates with the lower end face 86 of the battery 12 to firmly clamp the external minus terminal member 90b that extends outwardly from the printed circuit board 26, with a portion of said external minus terminal member 90b exposed to the outside of the battery package 10 through the perforation 94.

The top plate 84 integral with the plate member 74 has a perforation 96 defined therein and is adapted to cover the upper end face 18 of the battery 12. This top plate 84, when the protective member 16 is fitted to the battery 12 in the manner described hereinbefore, urges the lead plate 92 to contact the internal plus terminal 20 of the battery 12 with the external plus terminal member 92a exposed to the outside of the battery package 10 through the perforation 96.

To avoid any possible contact of the electroconductive lead plate 92 with the internal minus terminal 24 of the battery 12 and also to ensure a positive contact between the internal plus terminal 20 and the lead plate 92, a generally oblong flattened casing 100 is employed as best shown in FIGS. 1, 3A and 3B and is defined by a generally L-shaped base mount 98 in cooperation with the top plate 84 of the protective member 16. This casing 100 accommodated therein a generally U-sectioned intermediate partition 106 having an oblong body 102 and opposite side legs and is positioned between the base mount 98 and the top plate 84 while the base mount 98 is boded to the insulating member 22 through an end portion of the double-sided adhesive strip 64. By the reason which will become clear from the subsequent description, the base mount 98 is formed with a generally U-shaped cutout 98a.

As shown in FIG. 1, the lead plate 92 is of a generally U-shaped configuration having upper and lower segments with the upper segment serving as the external plus terminal member 90a. In an assembled condition of the battery package 10, the top plate 84 of the protective member 16 extends underneath the lower segment of the lead plate 92 while the internal plus terminal 20 is received within the cutout 98a in the base mount 98 and held in contact with the lower segment of the lead plate 92 and, at the same time, the oblong body 102 of the intermediate partition 106 is positioned between the upper and lower segments of the lead plate 92, as clearly shown in FIGS. 3A and 3B. The upper segment or external plus terminal member 90a of the lead plate 92 is then urged by the top plate 84 against its own resiliency with a portion of the external plus terminal member 90a exposed to the outside through the perforation 96. In this way, the upper segment or external plus terminal member 90a of the lead plate 92 can be sandwiched between the top plate 84 and a seat 104 that is formed unitarily with one of opposite surfaces of the oblong body 102 of the intermediate partition 106 remote from the lower segment of the lead plate 92.

The battery package 10 of the structure so far described can satisfactorily be used in practice. However, to avoid dismantling of the battery package 10 at a user's end which would expose the user to a hazardous condition, the battery package 10 is, before it is marketed, enclosed tightly by a protective covering except for respective portions aligned with the perforations 94 and 96, to thereby complete the battery package 10. For this protective covering, any known heat-shrinkable tube may be employed as is largely employed in the art.

Although in the foregoing embodiment of the present invention the electronic circuit device 30 has been shown and described as fitted to one of the four side faces of the battery 12 together with the protective member 16, it may be fitted to the upper end face 18 or the lower end face 86 together with the protective member 16 provided that the electronic circuit device 30 can further be downsized to a size sufficient to be encompassed by the upper or lower end face 18 or 86. In such case, the battery 12 may be of a generally cylindrical configuration.

Also, in place of the use of the printed circuit board 26, the electronic circuit component parts 28 may be fitted to one or more of the side faces of the battery 12 with an electrically insulating sheet intervening therebetween, in which case the electronic circuit, which has been shown as printed on the circuit board 26, may be formed on an inner surface of the protective member 16.

Again, in place of the use of the single protective member 16 for one battery 12, the single protective member 16 may be employed for a plurality of batteries 12 juxtaposed in one direction with their mount faces 72 facing in the same direction.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A battery package which comprises:
    a battery having at least one flat mount face defined therein;
    an electric circuit device for controlling discharging and charging of the battery, said electric circuit device comprising a plurality of circuit component parts, said electric circuit device being mounted on the flat mount face with the circuit component parts held in tight contact with the flat mount face; and
    a protective member mounted on the battery and covering the electric circuit device, said protective member including an oblong plate member and side flanges protruding transversely from opposite side edges of the plate member to thereby define a cavity for accommodating therein the electric circuit device when the protective member is fitted to the mount face.

2. The battery package as claimed in claim 1, wherein said battery possesses a configuration having four side surfaces and top and bottom surfaces, one of said side surfaces defining said mount face, and wherein said protective member further includes upper and lower end plates formed unitarily with the oblong plate member and extending transversely from respective opposite ends of the oblong plate member, said upper and lower end plates covering the top and bottom surfaces of the battery.

3. The battery package as claimed in claim 1 or 2, wherein said electric component parts are classified into a first group and a second group of the electric component parts, wherein the electrical component parts of the first group have a smaller size or thickness than the electric component parts of the second group, the electric component parts of the first group being covered by one half portion of the oblong plate member and the electric component parts of the second group being covered by another half portion of the oblong plate member, and wherein said oblong plate member is spaced from the mount face a distance determined in consideration of the respective sizes or thicknesses of the first and second groups of the electric component parts.

4. The battery package as claimed in claim 1, wherein said protective member concurrently serves as a circuit board for carrying the electric component parts.

5. The battery package as claimed in claim 1, wherein said electric circuit device comprises:
    a first control means for disabling a charging of the battery when a voltage across the battery during the charging exceeds a first upper limit voltage and for enabling the charging of the battery when the voltage across the battery lowers below a first lower limit voltage;

a second control means for forcibly halting the charging of the battery when the voltage across the battery during the charging exceeds a second upper limit voltage which is higher than the first upper limit voltage;

a third control means for interrupting a supply of an electric power to the first and second control means when a voltage supplied from an external source exceeds a third upper limit value which is higher than the second upper limit voltage; and a fourth control means for forcibly halting a supply of an electric power to the battery when a surface temperature of the battery exceeds a fixed value.

* * * * *